(12) United States Patent
Ballew et al.

(10) Patent No.: US 11,112,188 B1
(45) Date of Patent: Sep. 7, 2021

(54) PROCESS COOLING ROD

(71) Applicant: SANI-TECH WEST, INC., Camarillo, CA (US)

(72) Inventors: Chris Ballew, Thousand Oaks, CA (US); Richard Shor, Moorpark, CA (US)

(73) Assignee: SANI-TECH WEST, INC., Camarillo, CA (US)

( * ) Notice: Subject to any disclaimer, the term of this patent is extended or adjusted under 35 U.S.C. 154(b) by 0 days.

(21) Appl. No.: 17/144,424

(22) Filed: Jan. 8, 2021

(51) Int. Cl.
*F28F 1/40* (2006.01)
*F28F 13/12* (2006.01)
*B21C 37/20* (2006.01)

(52) U.S. Cl.
CPC .............. *F28F 1/40* (2013.01); *B21C 37/207* (2013.01); *F28F 13/12* (2013.01)

(58) Field of Classification Search
CPC .......... F28F 2009/029; F28F 1/00; F28F 1/14; F28F 1/36; F28F 1/40; F28F 2255/14; F28F 13/12; F28D 7/10; F28D 7/06; F28D 7/12; F28D 1/05316; B21C 37/207
See application file for complete search history.

(56) References Cited

U.S. PATENT DOCUMENTS

| | | | |
|---|---|---|---|
| 835,078 A * | 11/1906 | Nathan | B65D 85/84 206/524.2 |
| 3,952,724 A * | 4/1976 | Pei | F24S 10/45 126/655 |
| 5,339,890 A * | 8/1994 | Rawlings | F25B 30/06 165/45 |
| 5,667,758 A | 9/1997 | Matsugi et al. | |
| 5,765,385 A | 6/1998 | Childs | |
| 6,467,506 B1 * | 10/2002 | Nguyen | F01P 11/14 116/276 |
| 6,952,934 B2 | 10/2005 | Lee | |
| 2005/0139344 A1 * | 6/2005 | Butler | F28D 20/0034 165/46 |
| 2015/0075759 A1 * | 3/2015 | McCandlish | F28F 9/0229 165/173 |

FOREIGN PATENT DOCUMENTS

| | | | | |
|---|---|---|---|---|
| GB | 2133524 A | * | 7/1984 | .......... B29C 66/112 |
| JP | 63163792 A | * | 7/1988 | .............. F28D 7/12 |
| JP | 03007891 A | * | 1/1991 | |

* cited by examiner

*Primary Examiner* — Tho V Duong
(74) *Attorney, Agent, or Firm* — SoCal IP Law Group LLP; Guy Cumberbatch; Steven C. Sereboff (57) ABSTRACT

A process heat exchange rod for cooling or heating liquids in a process vessel. The rod may have a linear form and extend downward through an upper wall of the process vessel into proximity with the lower floor. The rod internally defines a circulatory flow path for the heat exchange medium, including an outer jacket and a flow diverter having a central through bore and external helical flutes. Heat exchange medium travels down through the central through bore and then back up through helical grooves formed between the flow diverter and the outer jacket, or vice versa. Accurate heating or cooling of the process fluid is attained by modification of the configuration of the heat exchange rod as well as the flow rate and temperature of the heat exchange medium. The components may be injection molded of a polymer, often transparent, having a high heat transfer coefficient.

17 Claims, 6 Drawing Sheets

PROCESS COOLING ROD

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to a heat exchange element for chemical and biological processes.

Description of the Related Art

Various chemical and biological processes in lab settings generate heat. For example, constant filtration of a process medium can quickly raise the temperature of the medium leading to deleterious outcomes, especially for fragile biological cells grown in media. A standard technique for reducing the temperature of process contents is to place the reactor or container within an ice bath. However, this introduces a number of challenges, not the least of which is accurately and consistently regulating the amount of cooling. Processes also sometimes require the addition of heat in regulated amounts.

There remains a need for a rapid heat exchange solution for chemical and biological processes that accurately and consistently regulates the amount of cooling or heating.

SUMMARY OF THE INVENTION

The present application discloses a process cooling element in the shape of a rod is described which can be inserted into a bioreactor or other reactor vessel to regulate the temperature. A method of use of the process cooling element includes immersing the rod into a liquid within a process vessel, the rod extending to at least 1 inch of the floor of the vessel to enable heat transfer with even small amount of liquid in the vessel. A manifold that projects out of the vessel has a fluid inlet connector and a fluid outlet connector. The cooling element includes an outer jacket and an inner flow diverter that extends from the manifold to a closed distal end of the outer jacket. The flow diverter has a central through bore and one or more outer helical flutes that contact an inner wall of the jacket and define one or more helical flow passages the length of the flow diverter. The method includes flowing cooling fluid into the inlet connector which travels down through the central bore and then up through the helical flow passage(s) to the outlet connector. The flow may be reversed so that the inlet becomes the outlet. The outer jacket and flow diverter are desirably formed of a polymer, sometimes transparent, with a high coefficient of heat transfer; which may be greater than 0.50 W/mK @23 C or even greater than 0.90 W/mK @23 C.

DETAILED DESCRIPTION

A process cooling element in the shape of a rod is described which can be inserted into a bioreactor or other reactor vessel to regulate the temperature. The primary application of the cooling rod is to reduce the temperature of the medium, but it should be understood that the beneficial attributes of the cooling rod also apply to raising the temperature of a process medium, and thus, more broadly, a heat exchanging element or rod is disclosed. Additionally, the cooling element is preferably shaped as an elongated linear rod, but could be adapted into other shapes, such as a curved rod or an irregular shape that mirrors the shape of the vessel in which it is used. Moreover, the size of the process cooling rod may vary depending on the cooling capacity required, and though a single cooling rod is shown in the exemplary application, multiple cooling rods can be used. Finally, preferred materials for the cooling rod are described, but should not be considered limiting unless explicitly claimed.

Figure 1:
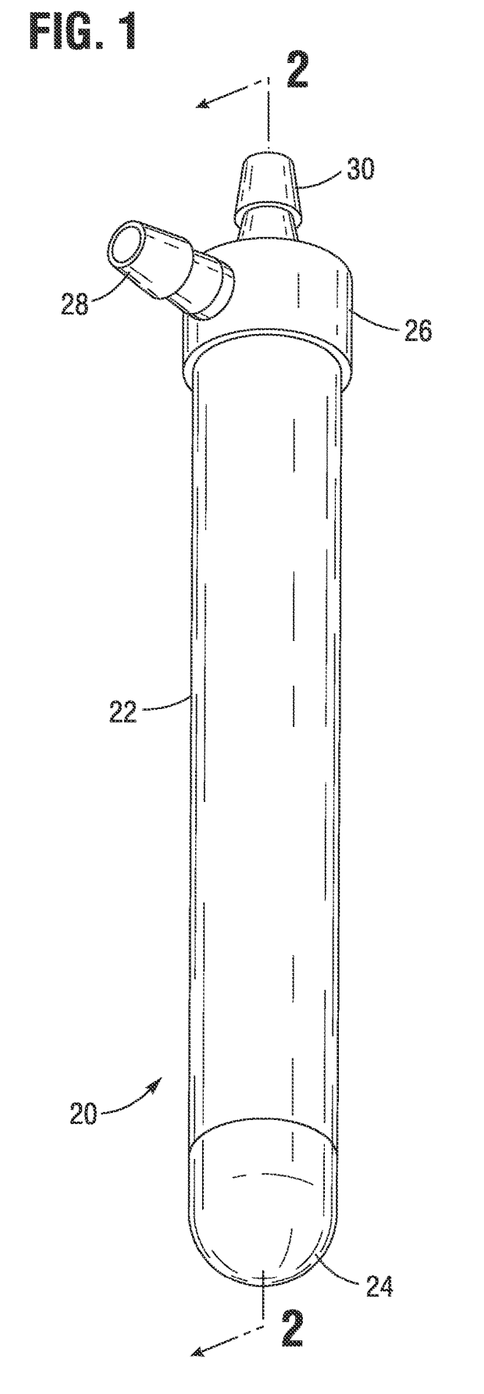
FIG. 1 is a perspective view of an exemplary process cooling rod.
Figure 2:
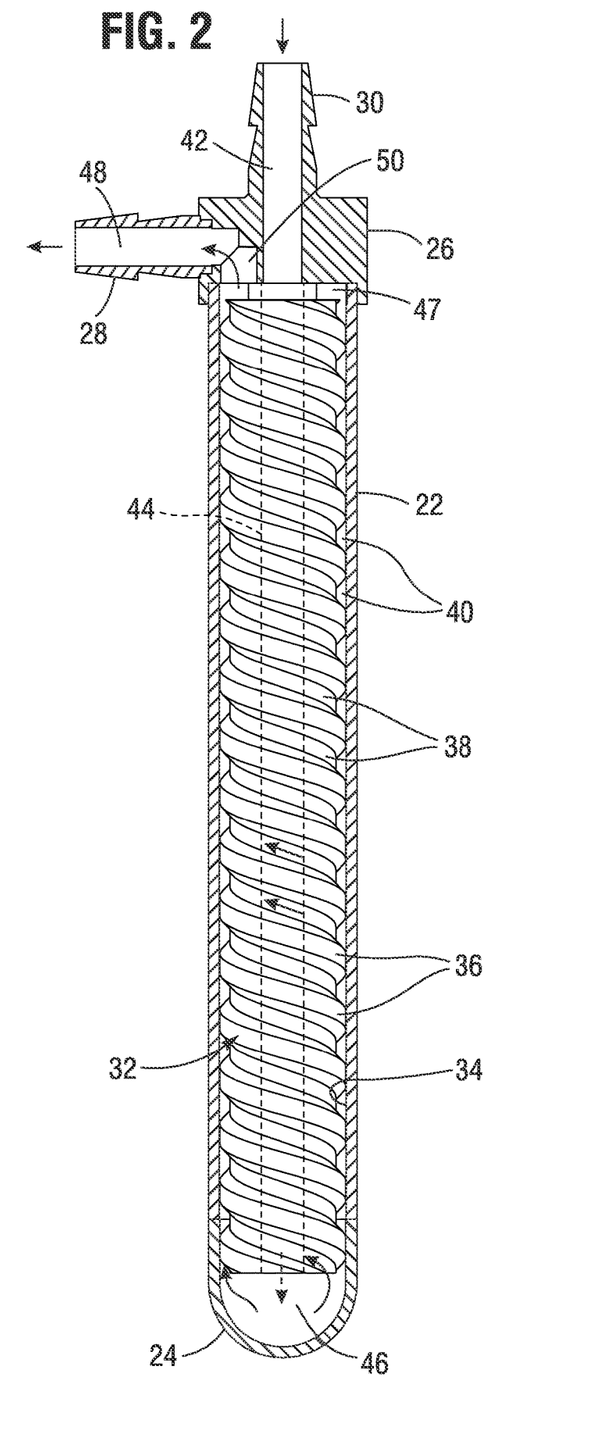
FIG. 2 shows the process cooling rod in longitudinal section.

FIG. 1 is a perspective view of an exemplary process cooling rod 20, and FIG. 2 shows the exemplary process cooling rod in longitudinal section. In the exemplary embodiment, the cooling rod 20 includes a hollow outer housing or jacket 22 having a closed end 24 and a hub or manifold 26 secured to an open end of the housing opposite the closed end. The manifold 26 provides a mount and internal passages for a first connector 28 and a second connector 30. The outer jacket 22 may be tubular and linear, defining a longitudinal axis, with the closed end 24 being formed by a hemispherical cap. The manifold 26 has a generally cylindrical configuration and is sealingly attached around the outside of the open end of the jacket 22, as seen in section in FIG. 2. Adhesives or heat bonding may be used to connect the parts. The first connector 28 projects radially from the manifold 26, while the second connector 30 projects axially and is centered along the longitudinal axis. Both connectors 28, 30 may be formed as conventional hose barbs.

Figure 3:
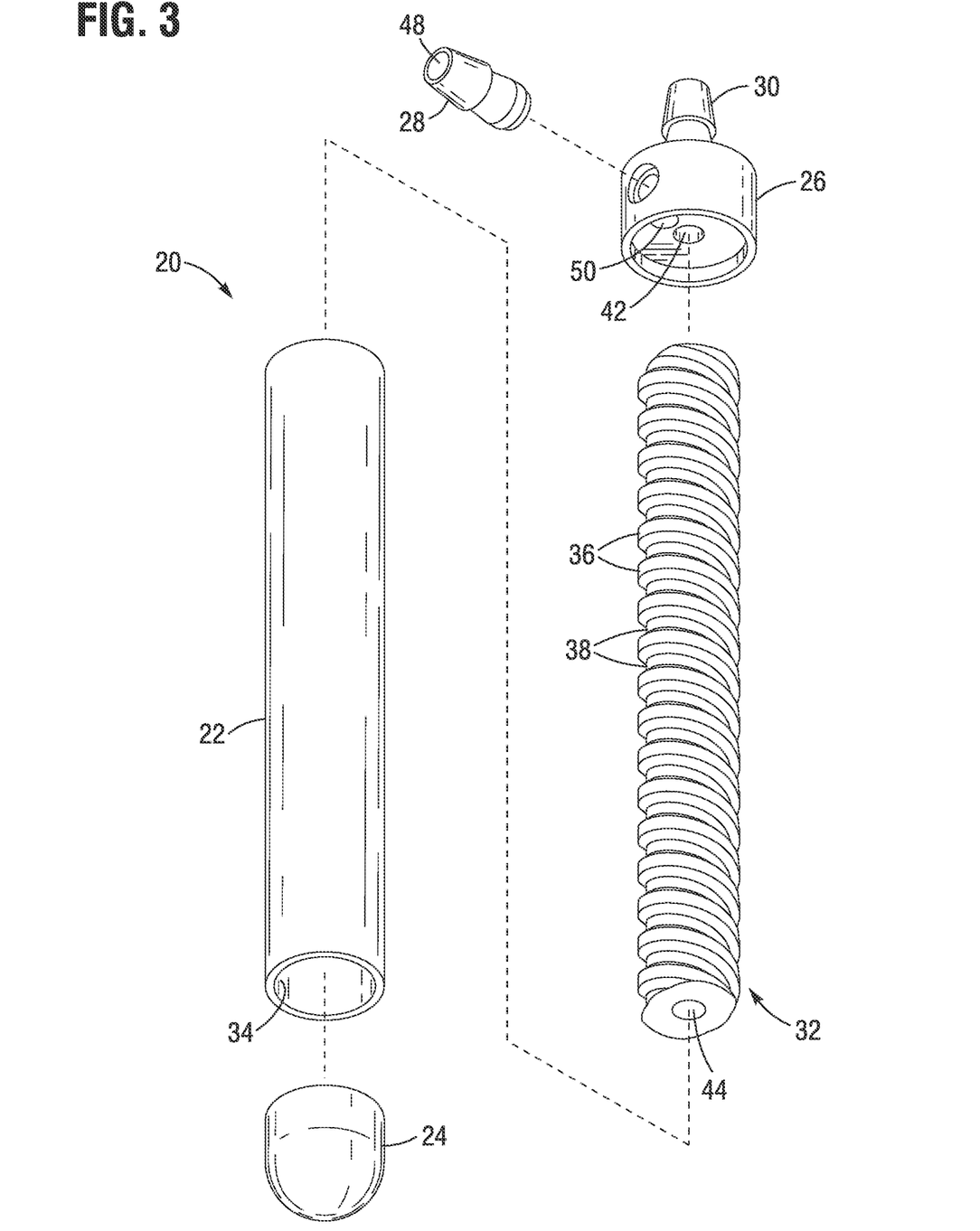
FIG. 3 is an exploded view of the process cooling rod.

With reference also to the exploded view of FIG. 3, an elongated flow diverter 32 fits closely within an inner wall 34 of the tubular jacket 22 and extends substantially its entire length. The flow diverter 32 defines helical ribs or flutes 36 which have flat outer lands size approximately the same as the diameter of the inner wall 34. The helical flutes 36 are sized and have a pitch such that there are two parallel flutes extending the length of the diverter 32. Recessed helical grooves 38 are formed between the flutes 36 which the define helical flow passages 40 within the inner wall 34.

The axially-oriented second connector 30 defines a central through bore 42 centered on the longitudinal axis which is in fluid communication with a central bore 44 through the flow diverter 32. The bore 44 extends the length of the flow diverter 32 between the manifold 26 and a plenum chamber 46 defined between a distal end of the diverter and the inside wall of the hemispherical cap 24. As seen by the arrows, pressurized fluid flowing into the through bore 42 of the connector 30 travels downward through the bore 44 until it reaches the plenum chamber 46.

The helical grooves 38 are open to the bottom end of the flow diverter 32 and thus the pressurized fluid within the plenum chamber 46 travels upward along the grooves. Eventually, fluid reaches the top of the flow diverter 32 and enters an annular space 47 defined within the outer jacket 22 and manifold 26. An outlet flow passage 48 formed within the first radially-oriented connector 28 communicates with the annular space 47 via a short axial passage 50 in the manifold 26. Of course, it should be understood that the flow can be reversed with the pressurized fluid entering through the first connector 28 and traveling downward through the helical grooves 38 and upward through the central bore 44. Either way, a constant flow of cooling (or heating) fluid can be circulated through the process cooling rod 20. Although not shown, the heat exchange medium may be circulated through a chiller or heater external to the heat exchange rod 20 and positioned near to the process vessel.

As seen in FIG. 3, the first connector 28 may be an item that is separately molded from the manifold 26. The second connector 30 may also be separate, but as seen in section in FIG. 2, is desirably molded as one piece with the manifold.

Figure 4:
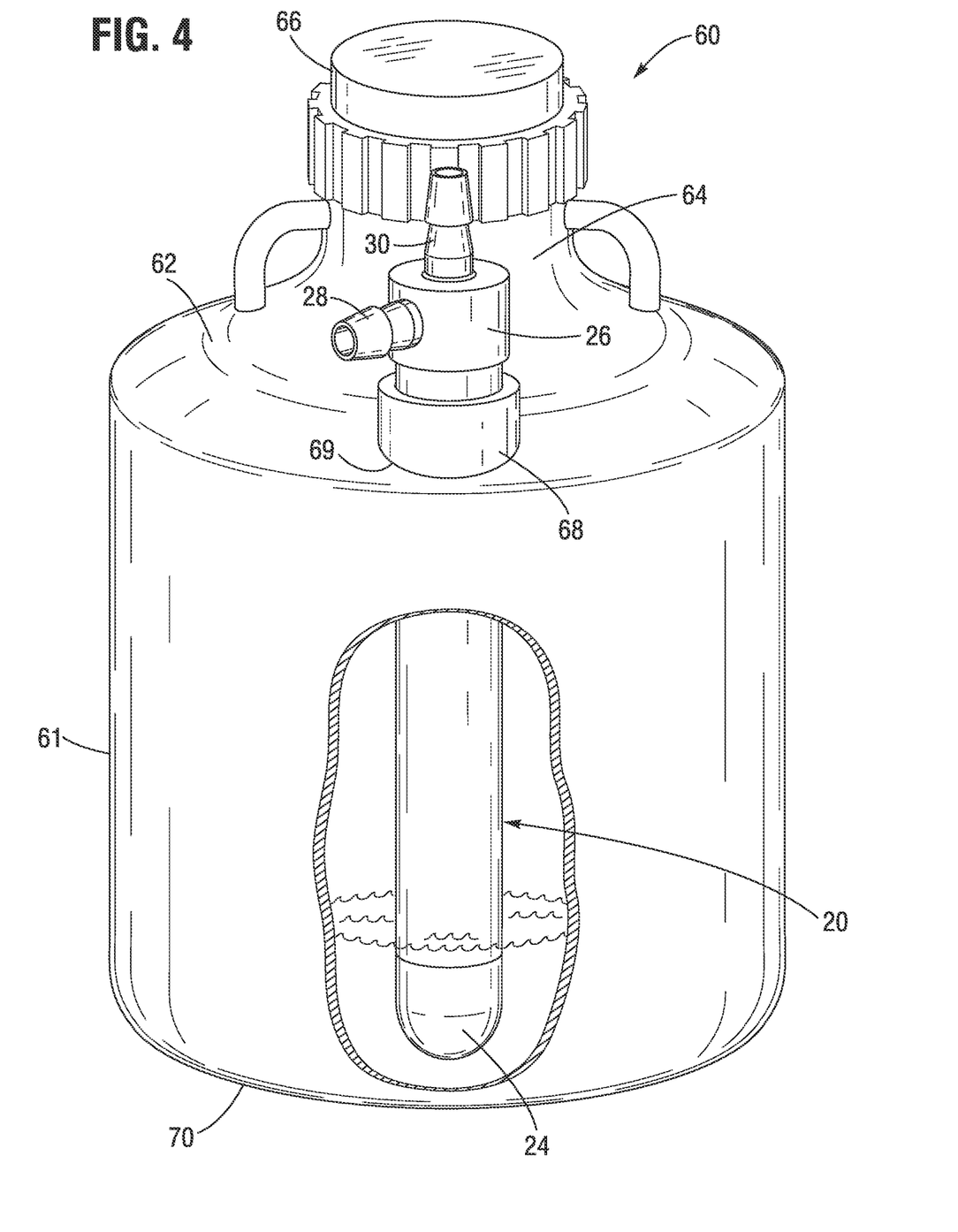
FIG. 4 shows a process vessel having the exemplary process cooling rod mounted through an upper wall thereof with a sealing sleeve.

FIG. 4 shows a process vessel 60 having the exemplary process cooling rod 20 mounted through an upper wall 62 thereof. In the illustrated embodiment, the process vessel 60 is a large flask having a generally cylindrical main portion 61 and an upwardly angled shoulder region that forms the upper wall 62. The vessel 60 continues upward into a neck region 64 leading to an upper mouth closed by a cap 66. The cap 66 may be replaced with a stirring assembly in some applications.

For sterility, a sleeve or other type of sealing sleeve 68 may be secured between the cooling rod 20 and a hole 69 through the upper wall 62. The sealing sleeve 68 may be removable, or the cooling rod 20 may be assembled (bonded or welded) with the process vessel 60 using the sealing sleeve 68, and sold as a single unit, thus providing a built-in option for cooling or heating the process fluid within the vessel. The sealing sleeve 68 may be elastomeric or a more rigid polymer bonded or welded to both the cooling rod 20 and the hole through the upper wall 62.

The cooling rod 20 extends downward into the process vessel 60 until the closed end cap 24 is in close proximity to a floor 70 of the vessel. In one embodiment, the length of the cooling rod 20 is such that when mounted through the sealing sleeve 68 the closed end cap 24 extends to within 1 inch of the floor 70 of the vessel 60. In this way, the cooling rod 20 reaches even low levels of fluid in the bottom of the vessel, as shown, to commence heat exchange therewith.

Although not shown, inlet and outlet tubular fluid conduits are then attached to the first and second connectors 28, 30 projecting from the manifold 26 to initiate cooling (or heating) flow through the cooling rod 20. As will be understood by those of skill in the art, the temperature and flow rate of the fluid through the cooling rod 20 can be varied so as to accurately regulate the temperature of the fluid within the vessel 60.

Figure 5:
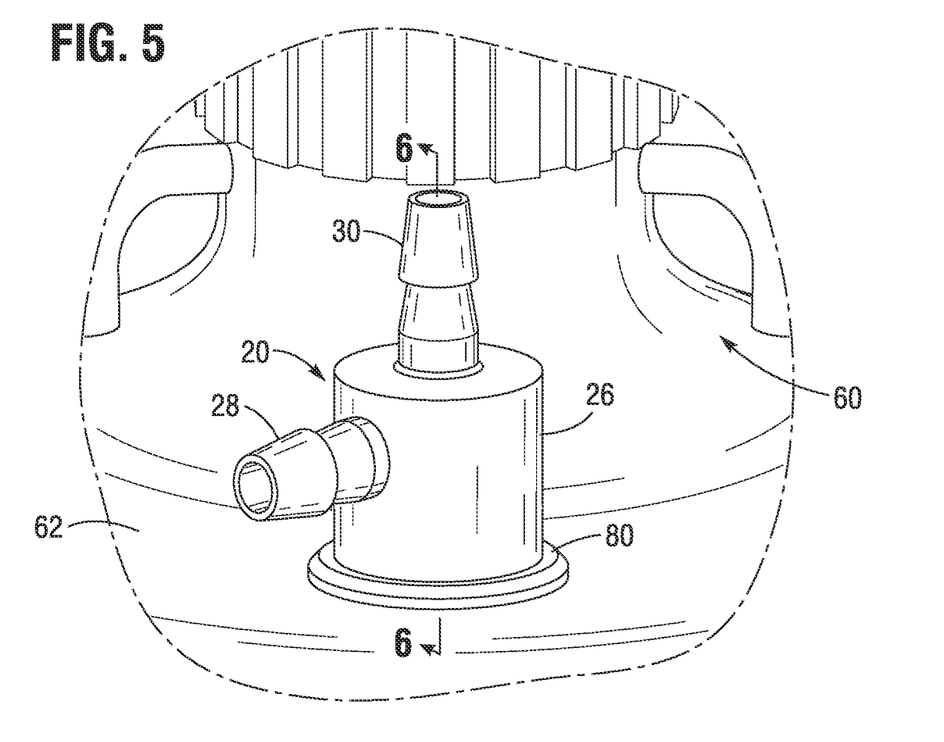
FIG. 5 is an enlargement of an upper wall of a process vessel showing an alternative mounting arrangement for the process cooling rod.
Figure 6:
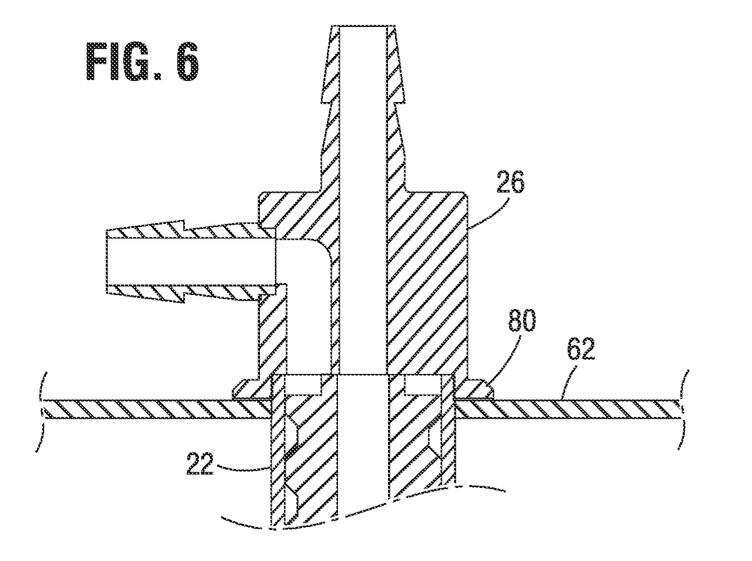
FIG. 6 is a vertical sectional view therethrough.

FIG. 5 is an enlargement of an upper wall 62 of a process vessel 60 showing an alternative mounting arrangement for the process cooling rod 20. FIG. 6 is a vertical sectional view of the alternative mounting arrangement, and shows the tubular jacket 22 of the cooling rod 20 passing downward through the hole in the upper wall 62. A circular flange 80 is formed at the lower end of the manifold 26 which is secured to the upper wall 62 via adhesive or bonding/welding. This mounting arrangement enables a more permanent connection which may be assembled by a manufacturer so that the process vessel 60 is shipped and sold as one with the cooling rod 20 installed.

Figure 7:
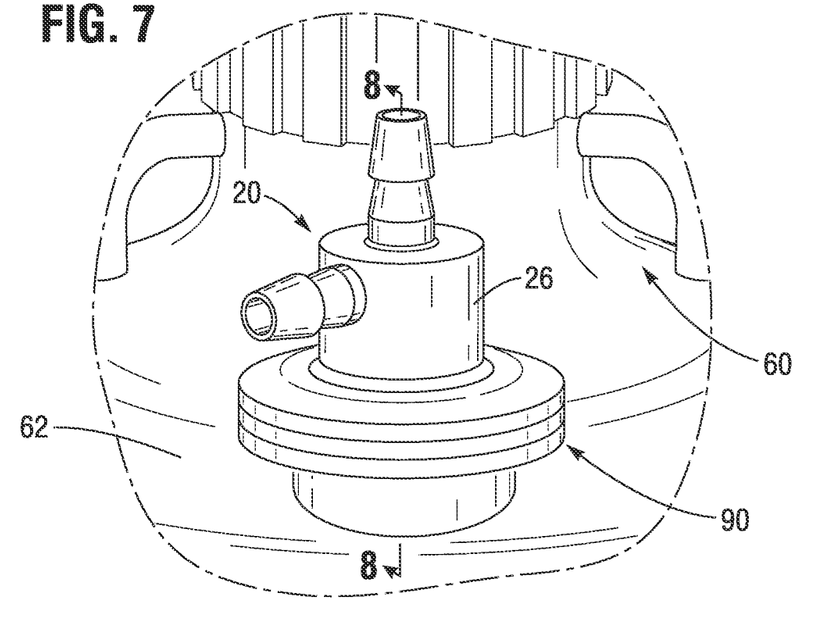
FIG. 7 is an enlargement of an upper wall of a process vessel showing a tri-clamp mounting assembly for the process cooling rod.
Figure 8:
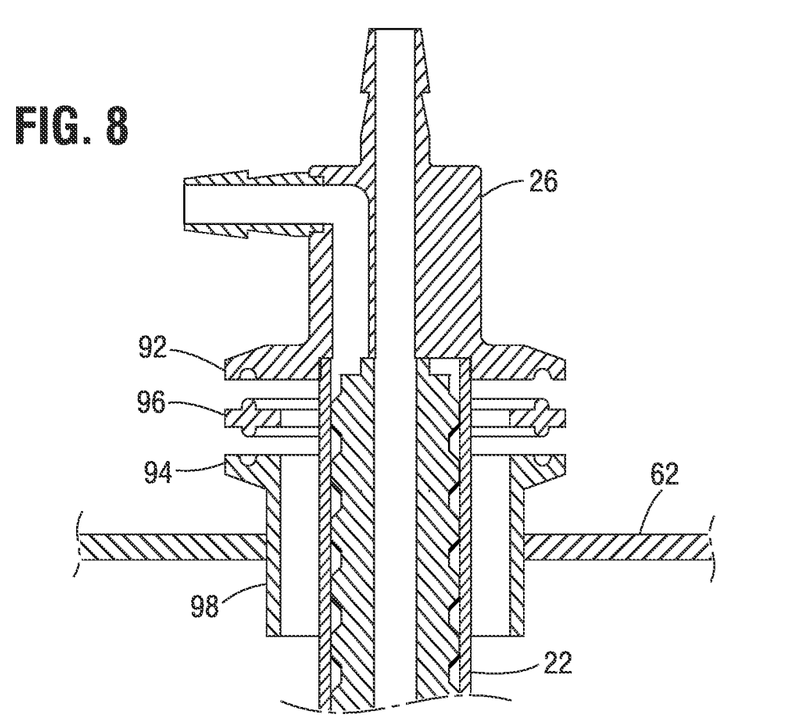
FIG. 8 is an exploded vertical sectional view therethrough.

FIG. 7 is an enlargement of an upper wall 62 of a process vessel 60 showing a tri-clamp mounting assembly 90 for the process cooling rod 20. FIG. 8 shows the assembly 90 exploded, which includes an upper flange 92 and a lower flange 94 that together sandwich an elastomeric gasket 94 therebetween. The upper flange 92 is shown formed as an integral part of the manifold 26 of the cooling rod 20, though of course it may be formed separately and sealed thereto. The lower flange 94 is connected to a downwardly-directed tubular sleeve 98. The tubular sleeve 98 passes downward through the hole in the upper wall 62 and may be sealed or otherwise bonded or fastened thereto. A lower surface of the upper flange 92 and an upper surface of the lower flange 94 have circular grooves that mate with circular ribs on top and bottom of the elastomeric gasket 94, as shown.

Although not shown, an external mechanical clamp is used per convention to hold the three tri-clamp parts together temporarily for a sanitary hermetic seal. For instance, Sanitary Fittings, LLC of Muskego, Wis. provides a number of different such clamps at https://sanitaryfittings.us/product-category/fittings/clamp-fittings/clamps, which are incorporated by reference.

The tri-clamp mounting assembly 90 enables easy attachment and detachment of the process cooling rod 20, or an alternative device such as a sampling instrument. Conversely, a cap may be attached to the lower flange 94 to close the opening.

Figure 9:
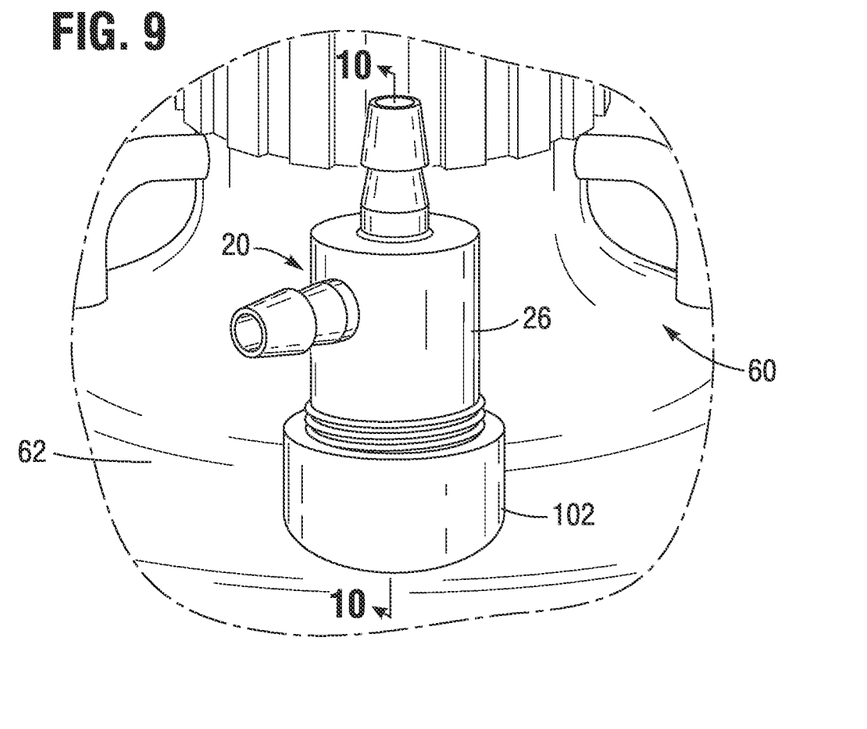
FIG. 9 is an enlargement of an upper wall of a process vessel showing a threaded mounting arrangement for the process cooling rod.
Figure 10:
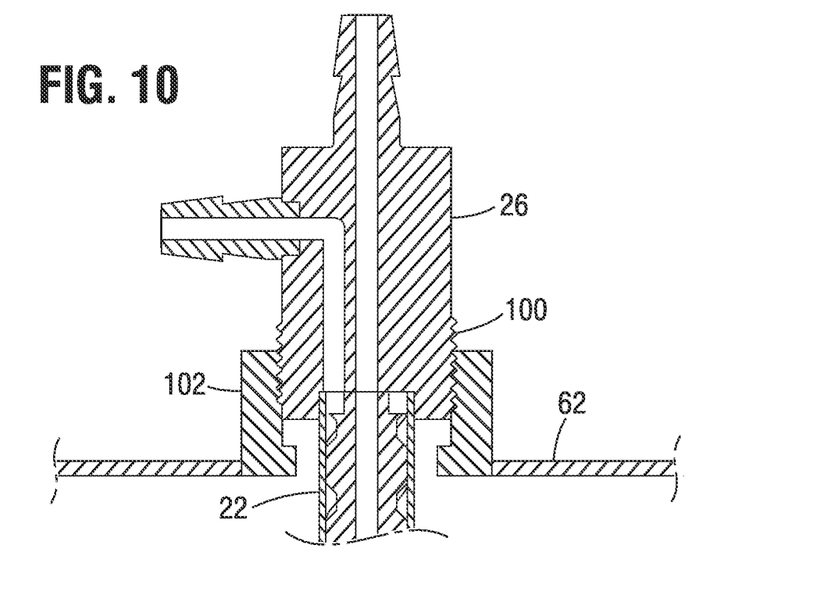
FIG. 10 is a vertical sectional view therethrough.

FIG. 9 is an enlargement of an upper wall 62 of a process vessel 60 showing a threaded mounting arrangement for the process cooling rod 20, and FIG. 10 is a vertical sectional view therethrough. In this assembly, male threads 100 formed at a lower end of the cooling rod manifold 26 mate with internal threads within a mounting sleeve 102. The sleeve 102, in turn, extends downward through the hole in the upper wall 62 and may be sealed or otherwise bonded or fastened thereto. The mating threads may be PG thread such as PG13.5 with a thread angle of 80°, commonly used for probes such as pH electrodes, Dissolved Oxygen (DO) probes, or temperature and conductivity probes, or they could be standard NPT thread, tapered or straight. This simple mounting architecture again enables easy attachment and detachment of the process cooling rod 20, or an alternative device such as a sampling instrument, or a plug may be attached to the mounting sleeve 102 to close the opening.

The helical structure of the flow diverter 32 maximizes the surface area of the outer helical cooling channel. Advantageously, the entire cooling rod 20 is made out of plastic. For instance, all of the components may be made out of transparent Polycarbonate which will allow video or still images to be taken of the flow as it flows. Preferably, the material is a plastic which is a) non-reactive, and b) one with as high a thermal transfer coefficient as possible, c) easy to manufacture, and d) recyclable. Stainless Steel and other non-reactive metals would work, though they are not perceived as disposable.

One exemplary material for use with the components of the cooling rod 20 is a highly heat conductive plastic termed Therma-Tech available from PolyOne Corporation of Avon Lake, Ohio. The Therma-Tech polymer formulation is a polypropylene base resin. A specific formulation given the product name X TT-10279-002-04 EI Natural (EM1003511360) by PolyOne has the following physical properties:

| Property | Method | Value/units |
| --- | --- | --- |
| Specific Gravity | ASTM D792 | 1.37 |
| Tensile Strength at Break | ASTM D638 | 3573 psi |
| Elongation at Break | ASTM D638 | 3.0% |
| Flexural Modulus | ASTM D790 | 354,000 psi |
| Flexural Strength at Yield | ASTM D790 | 6000 psi |
| Thermal Conductivity (TC) - In-plane | ASTM E1461 | 1.15 W/mK |
| Thermal Conductivity (TC) - Through-plane | ASTM E1461 | 0.98 W/mK |

Advantageously, the Therma-Tech polypropylene has a 40% higher thermal transfer rate than polycarbonate. Polycarbonates typically have a thermal transfer rate of between 0.19-0.22 W/mK @23 C. Preferably, therefore, the polymer used has a thermal transfer rate of at least 0.50 W/mK @23 C, and more preferably at least 0.90 W/mK @23 C.

Terms such as top, bottom, left and right are used herein, though the fluid manifolds may be used in various positions such as upside down. Thus, some descriptive terms are used in relative terms and not absolute terms.

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

As used herein, "plurality" means two or more. As used herein, a "set" of items may include one or more of such items. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

It is claimed:

1. A device comprising a fluid process cooling rod for cooling liquid in a process vessel, comprising:
   a process vessel adapted for holding liquid, the process vessel having an upper wall;
   a cooling rod including:
   i. an elongated polymer outer jacket extending along an axis defining a closed distal end and an open proximal end, an inner cavity defined within the outer jacket;
   ii. a manifold attached to the proximal end of the outer jacket, the manifold having two connectors providing fluid communication with the inner cavity, a first connector being offset from the centerline and a second connector being located along a centerline through the manifold and aligned with the outer jacket axis; and
   iii. an elongated polymer flow diverter positioned within the inner cavity, the flow diverter extending from the manifold to a point short of the closed distal end such that a distal space is formed in the inner cavity between the flow diverter and the closed distal end, the flow diverter having a central inner bore extending the length of the flow diverter and in fluid communication with the second connector fluidly connecting the second connector and the distal space, the flow diverter also having an outer surface defined by at least one helical flute extending the length of the flow diverter and having an outer diameter approximately equal to an inner diameter of the outer jacket so as to be in contact therewith, the at least one helical flute defining at least one helical groove spaced inward from the inner diameter of the outer jacket that forms at least one helical flow passage between the flow diverter and the outer jacket fluidly connecting the first connector and the distal space, wherein at least the outer jacket and the flow diverter are injection molded of a transparent polymer having a heat transfer coefficient of at least 0.50 W/mK @23 C,
   wherein the cooling rod mounts through a hole formed in the upper wall of the process vessel such that the closed distal end of the outer jacket extends downward toward a bottom of a main portion of the process vessel so as to be submerged in liquid within the process vessel, and wherein the cooling rod is configured such that fluid flowing into the second connector passes distally through the inner bore to the distal space, and returns proximally from the distal space through the at least one helical flow passage to the first connector, and fluid flowing into the first connector passes distally through the at least one helical flow passage to the distal space, and returns proximally from the distal space through the inner bore to the second connector, the fluid flowing through the cooling rod therefore cooling liquid within the process vessel.

2. The device of claim 1, wherein the polymer has a heat transfer coefficient of at least 0.90 W/mK @23 C.

3. The device of claim 1, wherein the polymer is a polypropylene base resin.

4. The device of claim 1, wherein there are two parallel helical flutes formed in the flow diverter that define two parallel helical grooves.

5. The device of claim 4, wherein the elongated jacket is linear and tubular and the closed distal end is hemispherical.

6. The device of claim 1, wherein the cooling rod is secured to the upper wall via adhesive, bonding or welding.

7. The device of claim 6, wherein the process vessel is a large flask having a generally cylindrical main portion and an upwardly angled shoulder region that forms the upper wall.

8. The device of claim 1, wherein the process heat exchange rod detachably mounts through a hole formed in the upper wall using a tri-clamp assembly or a threaded connection.

9. A device comprising a fluid process cooling rod for cooling liquid in a process vessel, comprising:
   a process vessel adapted for holding liquid, the process vessel having an upper wall;

a cooling rod including:
  i. an elongated linear tubular outer jacket extending along an axis defining a closed distal end and an open proximal end, an inner cavity defined within the outer jacket, the jacket formed by a transparent polymer having a heat transfer coefficient of at least 0.90 W/mK @23 C;
  ii. a manifold attached to the proximal end of the outer jacket, the manifold having two connectors providing fluid communication with the inner cavity, a first connector being offset from the centerline and a second connector being located along a centerline through the manifold and aligned with the outer jacket axis; and
  iii. an elongated linear flow diverter positioned within the inner cavity, the flow diverter extending from the manifold to a point short of the closed distal end such that a distal space is formed in the inner cavity between the flow diverter and the closed distal end, the flow diverter having a central inner bore extending the length of the flow diverter and in fluid communication with the second connector fluidly connecting the second connector and the distal space, the flow diverter also having an outer surface defined by ribs extending the length of the flow diverter and having an outer diameter approximately equal to an inner diameter of the outer jacket so as to be in contact therewith, the ribs defining at least one flow passage between the flow diverter and the outer jacket fluidly connecting the first connector and the distal space, the flow diverter formed by a transparent polymer having a heat transfer coefficient of at least 0.90 W/mK @ 23 C, wherein the cooling rod mounts through a hole formed in the upper wall of the process vessel such that the closed distal end of the outer jacket extends downward toward a bottom of a main portion of the process vessel so as to be submerged in liquid within the process vessel, and wherein the cooling rod is configured such that fluid flowing into the second connector passes distally through the inner bore to the distal space, and returns proximally from the distal space through the at least one flow passage to the first connector, and fluid flowing into the first connector passes distally through the at least one flow passage to the distal space, and returns proximally from the distal space through the inner bore to the second connector, the fluid flowing through the cooling rod therefore cooling liquid within the process vessel.

10. The device of claim 9, wherein the polymers with which both the outer jacket and the flow diverter are made are a polypropylene base resin.

11. The device of claim 9, wherein the closed distal end is hemispherical.

12. The device of claim 9, wherein the ribs comprise at least one helical flute extending the length of the flow diverter that defines at least one helical groove spaced inward from the inner diameter of the outer jacket that forms the at least one flow passage.

13. The device of claim 9, wherein there are two parallel helical flutes formed in the flow diverter that define two parallel helical grooves.

14. The device of claim 9, wherein the cooling rod is secured to the upper wall via adhesive or bonding/welding.

15. The device of claim 9, wherein the process vessel is a large flask having a generally cylindrical main portion and an upwardly angled shoulder region that forms an upper wall.

16. The device of claim 15, wherein the process vessel and cooling rod are assembled as a single retail unit and shipped and sold as such.

17. The device of claim 9, wherein the process cooling rod detachably mounts through a hole formed in the upper wall using a tri-clamp assembly or a threaded connection.

* * * * *